(12) United States Patent
Sumser et al.

(10) Patent No.: US 7,246,490 B2
(45) Date of Patent: Jul. 24, 2007

(54) INTERNAL COMBUSTION ENGINE INCLUDING A COMPRESSOR AND METHOD FOR OPERATING AN INTERNAL COMBUSTION ENGINE

(75) Inventors: Siegfried Sumser, Stuttgart (DE); Peter Fledersbacher, Stuttgart (DE); Helmut Finger, Leinfelden-Echterdingen (DE); Paul Löffler, Stuttgart (DE); Manfred Stute, Esslingen (DE); Klaus Rössler, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/518,545

(22) Filed: Sep. 8, 2006

(65) Prior Publication Data

US 2007/0044470 A1    Mar. 1, 2007

Related U.S. Application Data

(63) Continuation-in-part of application No. PCT/EP2005/002188, filed on Mar. 2, 2005.

(30) Foreign Application Priority Data

Mar. 9, 2004   (DE) .................. 10 2004 011 251

(51) Int. Cl.
*F02B 33/44* (2006.01)
(52) U.S. Cl. ........................ 60/605.2; 60/612
(58) Field of Classification Search ............. 60/605.1, 60/605.2, 612
See application file for complete search history.

(56) References Cited

U.S. PATENT DOCUMENTS

| 4,719,758 | A | | 1/1988 | Sumser | |
|---|---|---|---|---|---|
| 4,776,167 | A | | 10/1988 | Kawamura | |
| 5,468,004 | A | * | 11/1995 | Olson et al. | 280/11.217 |
| 6,062,026 | A | * | 5/2000 | Woollenweber et al. | 60/605.2 |
| 6,324,848 | B1 | * | 12/2001 | Gladden et al. | 60/612 |
| 6,718,768 | B2 | * | 4/2004 | Shaffer | 60/605.1 |
| 6,925,806 | B1 | * | 8/2005 | Zollinger et al. | 60/602 |
| 2002/0116926 | A1 | | 8/2002 | Sumser et al. | |

FOREIGN PATENT DOCUMENTS

| DE | 28 40 375 | 4/1980 |
|---|---|---|
| DE | 29 12 950 | 10/1980 |
| DE | 31 00 732 | 8/1983 |
| DE | 692 19 822 | 1/1993 |
| DE | 199 55 508 | 4/2001 |

(Continued)

*Primary Examiner*—Hoang Nguyen
(74) *Attorney, Agent, or Firm*—Klaus J. Bach

(57) ABSTRACT

In an internal combustion engine and a method of operating the engine which comprises a compressor having an impeller disposed in a housing including a main inlet duct in which the impeller is supported and an additional inlet duct joining the main inlet duct in the area of the compressor impeller, and valving means for controlling the gas supply to the inlet ducts and an electric motor connected to the compressor impeller for rotation therewith so that the compressor is operable by the electric motor and by the pressure drop in the air intake line of the engine, a flywheel is coupled to the impeller for storing rotational energy when the impeller is driven by the intake gas and returning the energy to the impeller when the pressure drop collapses upon a sudden increase in the demand for engine power.

9 Claims, 3 Drawing Sheets

FOREIGN PATENT DOCUMENTS

| | | |
|---|---|---|
| DE | 102 15 779 | 11/2003 |
| DE | 102 21 014 | 11/2003 |
| DE | 102 44 536 | 4/2004 |
| DE | 102 52 767 | 5/2004 |
| DE | 103 29 019 | 1/2005 |
| EP | 0 522 819 | 1/1993 |
| EP | 1 443 189 | 8/2004 |
| WO | WO 2005/001258 | 1/2005 |

* cited by examiner

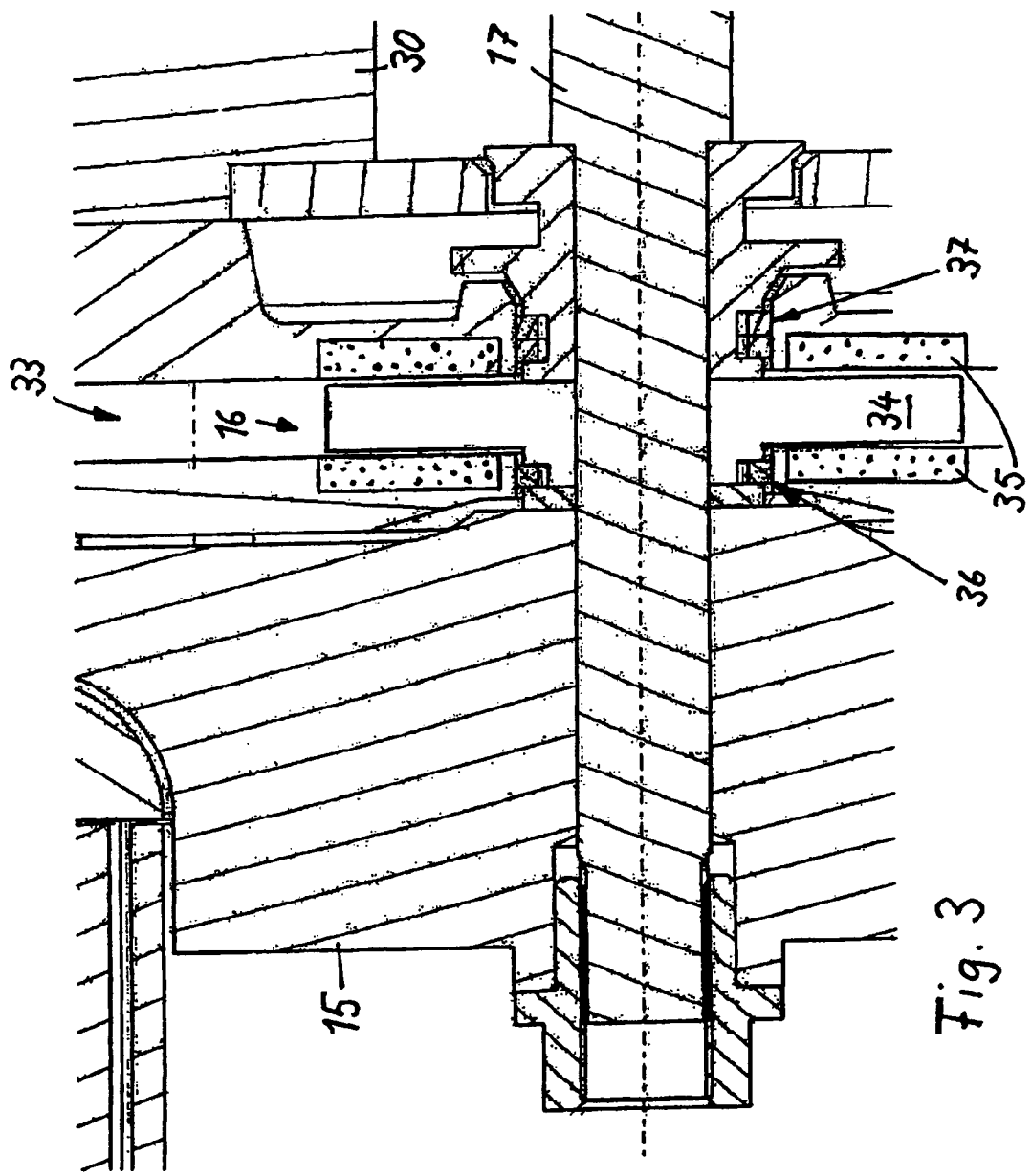

INTERNAL COMBUSTION ENGINE INCLUDING A COMPRESSOR AND METHOD FOR OPERATING AN INTERNAL COMBUSTION ENGINE

This is a Continuation-In-Part Application of International Patent Application PCT/EP2005/002188 filed Mar. 2, 2005 still pending and claiming the priority of German Patent Application 10 2004 011 251.7 filed Mar. 9, 2004.

BACKGROUND OF THE INVENTION

The invention relates to an internal combustion engine comprising a compressor including an impeller and an electric motor for driving the impeller and to a method for operating an internal combustion engine.

A turbocharger for an internal combustion engine which comprises a compressor in the intake line and an exhaust gas turbine in the exhaust gas line is described in the publication DE 692 19 822 T2. Herein, the turbine wheel is coupled to the compressor impeller in a rotationally fixed manner by a shaft, so that the rotation of the turbine wheel generated by means of the exhaust gases of the internal combustion engine is also transmitted to the compressor impeller. The compressor then compresses combustion air from the environment to an elevated charging pressure. The exhaust gas turbocharger also includes an electric motor, by means of which the charger can additionally be driven electrically in certain operating phases. The electric motor comprises a stator fixed to the housing and a rotor arranged in a rotationally fixed manner on the shaft in the region between turbine wheel and compressor impeller.

DE 199 55 508 C1 discloses an exhaust gas turbocharger for an internal combustion engine having a compressor with a housing which includes, parallel to an axial compressor inlet duct in which the compressor impeller is rotatably mounted, an additional duct which opens into the compressor inlet duct at the level of the compressor impeller. Combustion air can be supplied to the compressor impeller both via the compressor inlet duct and via the additional duct. The path via the additional duct is selected in particular in low load and low speed operating states of the internal combustion engine. With the low pressure which prevails in these operating states in the region of the cylinder inlets of the internal combustion engine, a pressure drop exists across the compressor which makes flow via the additional duct and the compressor impeller possible even without external drive of the compressor impeller. The combustion air supplied via the additional duct meets the compressor impeller blades radially and imparts a driving torque to the impeller. At low loads and speeds, the compressor can consequently be operated like a turbine (cold-air turbine operation). This mode of operation makes it possible to maintain a minimum speed level of the exhaust gas turbocharger in all operating states of the internal combustion engine.

A supercharged internal combustion engine with an exhaust gas turbocharger and an additional compressor in the intake line is also known from DE 102 21 014 A1. The compressor of the exhaust gas turbocharger has an additional duct which extends parallel to the compressor inlet duct and opens into the compressor inlet duct at the level of the compressor impeller blades. An actuator allows the air supply to be set axially via the compressor inlet duct to the compressor impeller and also radially via the additional duct to the compressor impeller blades. The shaft of the exhaust gas turbocharger can also be driven directly by means of an electric motor.

It is the object of the present invention to overcome the problem of keeping the compressor impeller speed at a minimum level with low energy expenditure. In particular when a compressor is used in an internal combustion engine, it is to be ensured on one hand that a minimum speed of the compressor is maintained during no-load operation and in the lower part-load range of the internal combustion engine and, on the other hand, that charge air is made available with the smallest possible time delay for rapid acceleration of the engine.

SUMMARY OF THE INVENTION

In an internal combustion engine and a method of operating the engine which comprises a compressor having an impeller disposed in a housing including a main inlet duct in which the impeller is supported and an additional inlet duct joining the main inlet duct in the area of the compressor impeller, and valving means for controlling the gas supply to the inlet ducts, and an electric motor connected to the compressor impeller for rotation therewith so that the compressor is operable by the electric motor and by the pressure drop in the air intake line of the engine, a flywheel is coupled to the impeller for storing rotational energy when the impeller is driven by the intake gas and returning the energy to the impeller when the pressure drop collapses during a sudden increase in the demand for engine power.

This design makes it possible for the compressor to store rotational energy in phases without a requirement for external compressor drive power which can be released again in phases with requirements for the compressor power to be delivered. In the resting phase of the compressor, provision could also be made for its uncoupling from the flywheel for loss reduction, if appropriate. In this connection, the electric motor serves for stabilizing the speed at a desired speed level. As the rotational energy is obtained primarily from the pressure drop across the compressor, however, an electric motor of small size with low power consumption is sufficient for maintaining the desired compressor impeller speed. This distinguishes the compressor according to the invention from designs which are known from the prior art as electric motors of relatively large size usually have to be used in the latter in order for it to be possible to release compressor work promptly in the event of a compressor power requirement.

In the compressor according to the invention, the rotational energy is stored in the flywheel in the operating phases in which no compressor drive power is required in such a way that it can also be released again promptly. Because of the desired low air friction losses, the flywheel will be disposed in a housing which is largely evacuated. As soon as there is a requirement for compressor work, the flow through the compressor inlet duct can be opened, whereupon the gas supplied thereto is compressed by the rotating compressor impeller to the desired, elevated charging pressure.

The electric motor is advantageously arranged on the rear side of the compressor impeller, in particular in a buffer space, which lies between the compressor housing and a bearing housing in which the compressor impeller shaft is mounted rotatably in oil-lubricated sealing locations. This buffer space serves as an isolation volume between the bearing housing and the compressor impeller, which results in an effective oil sealing arrangement. The pressure conditions in the region of the compressor impeller are neutralized to atmospheric pressure in the buffer space, so that no suction pressure is transmitted and no oil is sucked in from the sealing locations of the shaft of the compressor even in the event of low pressure prevailing downstream of the compressor impeller. The electric motor can be accommodated in this buffer space with low constructional outlay and without the need for additional construction space. Moreover, the rotor of the electric motor mounted on the compressor impeller shaft can be structured in such a way that the formation of a centrifugal force field, which could generate an undesirable suction effect at the sealing location on the side facing away from the compressor impeller is avoided, or even overcompensated, by a pressure increase.

The flywheel is, preferably arranged on the compressor impeller shaft, in particular adjacent to the rear side of the compressor impeller. The electric motor and the flywheel can be arranged on the same side of the compressor impeller, advantageously on the compressor impeller rear side. In an advantageous embodiment the electric motor, as already illustrated, is arranged in the buffer space functioning as a relief volume directly adjacent the rear side of the compressor impeller, and the flywheel is mounted on the compressor impeller shaft on the same side as but at a greater distance from, the rear side of the compressor impeller.

The internal combustion engine according to the invention is equipped with a compressor of the kind described above which is operated as a cold-air turbine during in no-load operation and in the lower part-load range of the internal combustion engine using the low pressure prevailing directly at the cylinder inlet; in this connection, the combustion air for driving the compressor impeller is conducted via the additional duct, and the rotational energy is stored in the flywheel. With increasing load and speed and an associated charging pressure requirement above atmospheric pressure, the compressor must perform compression work, for which purpose the flow path for the combustion air is switched over from the additional duct to the compressor inlet duct, so that the compressor is then capable of performing compressor work which is fed by the rotational energy of the flywheel.

Such a compressor is advantageously combined in an internal combustion engine with an exhaust gas turbocharger in which a turbo-compressor is arranged in the intake run of the internal combustion engine and an exhaust gas turbine is arranged in the exhaust gas line. The turbo-compressor of the exhaust gas turbocharger and the compressor equipped with a flywheel and an electric motor are connected in series, in particular in such a way that the compressor with the electric motor and flywheel is arranged downstream of the turbo-compressor and immediately before the cylinder inlets. In this configuration, the compressor with the flywheel and the electric motor has what is known as a boost function, which is used for a short-term increase in power. This boost function is advantageously used for bridging what is known as a turbo hole of the exhaust gas turbocharger, which occurs by virtue of the fact that the supply of exhaust gas for driving the exhaust gas turbocharger is yet insufficient at relatively low speeds of the internal combustion engine. The compressor consequently has the function of a short-term acceleration aid.

The compressor with the electric motor and the flywheel is advantageously designed as an individual compressor, the drive source of which is the electric motor mentioned and also the pressure drop in the intake duct during no-load operation and the lower part-load range of the internal combustion engine. However, the compressor can also be part of an exhaust gas turbocharger. In this case the electric motor ensures speed stabilization of the charger in the operating range of the internal combustion engine in which a sufficiently high exhaust gas backpressure for maintaining an adequate minimum speed of the charger is not generated.

Expediently, a bypass, with an adjustable closing element, which bridges the compressor impeller of the compressor is provided, the bypass usually being opened at high loads and speeds of the internal combustion engine for bypassing the additional compressor and being closed in the lower and intermediate part-load ranges. When the bypass is closed, the fresh combustion air is conducted through the additional compressor, so that either cold-air turbine operation (flow through the additional duct) is established or a charging pressure is generated (flow through the compressor inlet duct) depending on the air flow path. At high loads, on the other hand, the upstream exhaust gas turbo-charger has reached its full capacity, and the high charging pressure necessary is generated by means of the turbo-compressor of the exhaust gas turbocharger; in these operating ranges, the additional compressor can no longer contribute to the generation of the charging pressure and would only bring about undesirable throttling, which can be avoided by opening the bypass.

Further advantages of the invention will become apparent from the following description of advantageous embodiments thereof on the basis of the accompanying drawings:

BRIEF DESCRIPTION OF THE DRAWINGS

FIG. 3 shows an enlarged detail of FIG. 2 concerning the region where the electric motor is mounted on the compressor impeller shaft.

DESCRIPTION OF PREFERRED EMBODIMENTS

Figure 1:
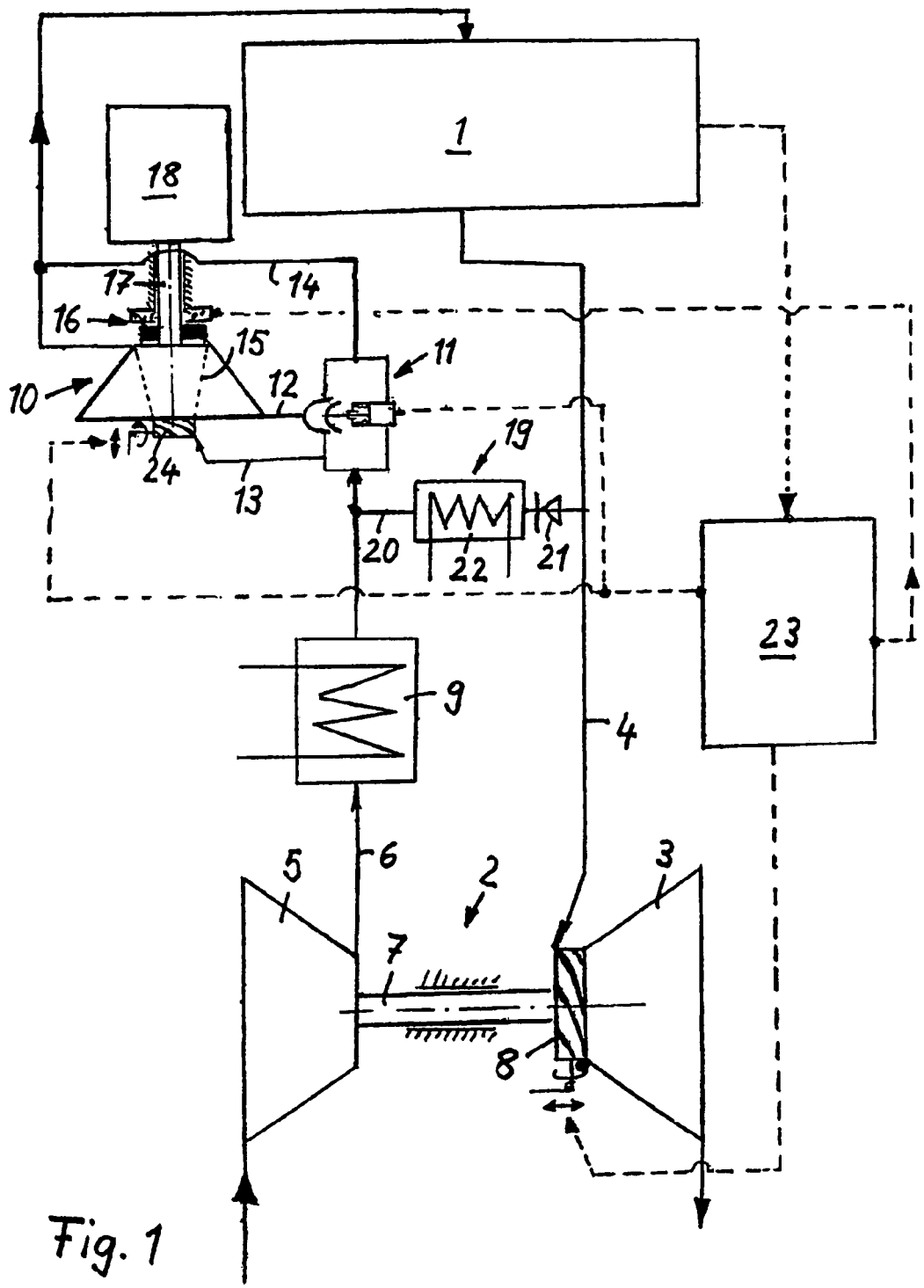
FIG. 1 is a diagrammatic illustration of an internal combustion engine with an exhaust gas turbocharger and an additional compressor which is equipped with an electric motor and a flywheel.

FIG. 1 shows an internal combustion engine 1—a spark ignition engine or a diesel engine—which is equipped with an exhaust gas turbocharger 2 that comprises an exhaust gas turbine 3 in the exhaust gas line 4 and a turbo-compressor 5 in the intake line 6 of the internal combustion engine. The compressor impeller of the turbo-compressor 5 is coupled to the turbine wheel of the exhaust gas turbine 3 in a rotationally fixed manner by means of a shaft 7. The turbine wheel of the exhaust gas turbine 3 is driven by the exhaust gases under pressure of the internal combustion engine 1, the rotary movement being transmitted by means of the shaft 7 to the compressor impeller in the turbo-compressor 5, which then sucks combustion air in from the environment under atmospheric pressure and compresses it to an elevated charging pressure. The exhaust gas turbine 3 is provided with a variable turbine geometry 8 (vane structure), by means of which the effective turbine inlet cross section can be adjusted between a minimum opening retaining position and a fully open-release position.

Downstream of the turbo-compressor 5, the combustion air is cooled in a charge air cooler 9 and then, in the further course of the intake line 6, supplied to an additional compressor 10, which is an individual compressor and is intended for providing a short-term charging pressure increase. The individual compressor 10 is arranged close to the engine, so that in principle no throttle valve is needed in the intake line (6).

The individual compressor 10 includes a valve element 11, by means of which the air flow to the compressor inlet duct 12, into an additional duct 13 extending parallel to the compressor inlet duct, and into a bypass 14 bridging the compressor impeller 15 of the single compressor can be controlled. The compressor impeller 15 mounted on a compressor impeller shaft 17 is mounted rotatably in the compressor inlet line 12. The combustion air is supplied via the compressor 10 during operating phases in which the individual compressor 10 is intended to generate additional charging pressure. The additional duct 13 extends parallel to the compressor inlet duct 12 and opens radially into the inlet area of the compressor impeller 15, via an adjustable swirl vane structure 24, which imparts additional swirl to the inflowing combustion air. The combustion air strikes the compressor impeller 15, which is arranged in the inlet flow path to the individual compressor. The path via the additional duct 13 is opened in particular during no-load operation and in the lower part-load operating range of the internal combustion engine 1 when the pressure at the cylinder inlet of the internal combustion engine is low. As a result, a pressure drop is established across the compressor 10, which can be used for driving the compressor impeller 15 (cold-air turbine operation).

The flow path via the bypass 14 can be selected at high loads and speeds of the internal combustion engine 1 as in these operating states the path via the single compressor 10 would only result in throttling of the combustion air supplied to the engine, which, however, is not desirable. The charging pressure required is provided by means of the turbo-compressor 5 of the exhaust gas turbocharger 2 in the upper load and speed range.

The individual compressor 10 is equipped with a driving electric motor 16, the rotor of which is located in a rotationally fixed manner on the compressor impeller shaft 17 of the compressor impeller 15, and the stator of which is arranged on the compressor housing. Furthermore, a flywheel 18, which serves for storing rotational energy, is coupled to the compressor impeller shaft 17 in a rotationally fixed manner. The electric motor 16 is arranged directly adjacent to the compressor impeller rear side, and the flywheel 18 also faces the compressor impeller rear side but is located at a greater distance from the impeller than the electric motor 16.

In cold-air turbine operation, in which combustion air is to be supplied to the compressor impeller 15 via the additional duct 13 and the impeller is driven, rotational energy is stored in the flywheel 18. A minimum speed level of the compressor impeller can be ensured by means of the electric motor 16.

When accelerating out of idle, the valve element 11 is switched over, so that the combustion air is directed through the compressor inlet duct 12. The individual compressor 10 is then operated as a compressor, and the combustion air supplied is compressed to an elevated charging pressure. This operating mode helps to bridge what is known as a turbo hole of the exhaust gas turbocharger 2 at low loads and speeds. In this connection, the compressor work is provided by the rotational energy stored in the flywheel 18.

Furthermore, the internal combustion engine 1 is equipped with an exhaust gas recirculation arrangement 19, which comprises a recirculation line 20 between the exhaust gas line 4 upstream of the exhaust gas turbine 3 and the intake line 6 downstream of the charge air cooler 9, an adjustable stop valve 21 and an exhaust gas cooler 22 connected downstream of the stop valve being arranged in the recirculation line 20.

The controllable devices of the internal combustion engine can be operated depending on state variables and operating variables by means of a control unit 23. The adjustable devices are in particular the variable turbine geometry 8 of the exhaust gas turbine 3, the valve element 11 of the individual compressor 10, the variable inlet vane structure 24 in the individual compressor 10 and the stop valve 21 of the exhaust gas recirculation arrangement 19.

Figure 2:
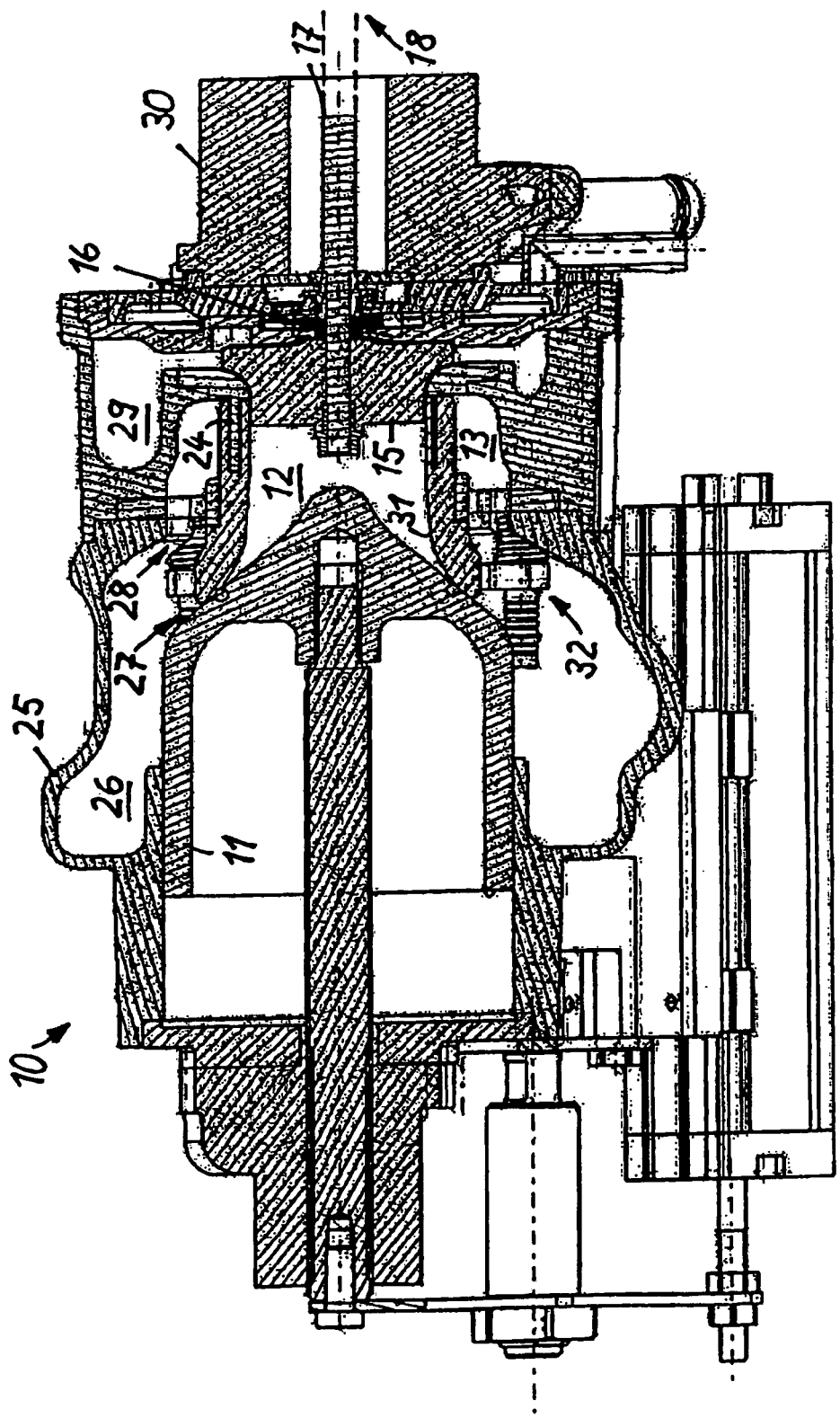
FIG. 2 shows a section through the additional compressor.

FIG. 2 illustrates the individual compressor 10 in a sectional view. During compressor operation, intake air is admitted to the compressor impeller 15 via the compressor inlet duct 12, in which the compressor impeller 15 is supported rotatably about the axis of the compressor impeller shaft 17. The intake air is supplied to the compressor inlet duct 12 via an upstream air collection space 26, which is in communication with the compressor inlet duct 12 via a transfer opening 27. In the illustrative embodiment, the transfer overflow opening 27 is closed by the axially displaceable closing element 11, which is shown in a closed position sealing off the compressor inlet duct 22.

The air collection space 26 is moreover connected via a further transfer opening 28 to the additional duct 13, which extends parallel to the compressor inlet duct 12 and surrounds the latter. The additional duct 13 opens radially into the compressor inlet duct 12 at the axial location of the compressor impeller 15. In the illustrative embodiment according to FIG. 2, the opening cross section is closed by an axially displaceable actuator in the form of an axial slide member 31. The axial slide 31 is biased by a spring arrangement 32, which is supported on the compressor housing 25, toward its open position opening the flow cross section of the additional duct 13 into the compressor inlet duct 12 but is in the illustrative embodiment displaced by the closing element 11 counter to the force of the spring arrangement 32 into its closed position blocking off the opening. In the open position of the axial slide 31, the flow cross section of the additional duct 13 into the compressor inlet duct 12 is open. The swirl vane structure 24, which serves to impart swirl to the inflowing combustion air with which the combustion air strikes the compressor impeller blades, is arranged in the flow duct structure.

The combustion air passing through the compressor impeller 15 is discharged radially via a diffuser into an outlet duct 29, via which the combustion air is subsequently introduced into the air intake line.

The compressor impeller shaft 17 is mounted rotatably in a bearing housing 30 connected firmly to the compressor housing 25. An annular buffer space in which atmospheric pressure prevails and which has the function of bringing about pressure isolation and aerodynamic isolation, so that pressure differences between oil-lubricated sealing locations of the compressor impeller shaft and the clean air side of the compressor impeller cannot lead to lubricating oil passing from the bearing housing into the compressor impeller region, is formed between the bearing housing 30 and the rear side of the compressor impeller 15. Moreover, the electric motor 16 is accommodated in the buffer space.

The flywheel 18, which is connected in a rotationally fixed manner to the compressor impeller shaft, is arranged in the region of the extension of the compressor impeller shaft 17 drawn in dashed lines.

As can be seen from the enlarged detail in FIG. 3, the electric motor 16, the annular rotor 34 of which is connected in a rotationally fixed manner to the compressor impeller shaft 17 and the stator 35 of which is supported on the compressor housing and encloses both end sides of the rotor 34, is arranged in the annular buffer space 33. The buffer space 33 including the electric motor 16 accommodated therein is located axially between the bearing housing 30 and the rear wall of the compressor impeller 15.

Sealing locations 36 and 37 which delimit the buffer space 33 are also shown in FIG. 3. The sealing location 36 represents a sealing location of the compressor impeller 15 in relation to the buffer space 33, the axial end side of which is formed by the rear wall of the compressor impeller. The sealing locations 36 and 37 prevent oil passing into the clean air region of the compressor impeller.

A magnetic bearing arrangement can be used for mounting the compressor impeller shaft, as a result of which power losses can be kept extremely low. As the compressor is designed as a individual compressor, no conditions affecting the magnetic bearing arrangement, which prevail in the case of an exhaust gas turbocharger, for example, because of the heat generation on the turbine side, are present. A magnetic bearing arrangement moreover has the advantage that no oil lubrication is needed.

What is claimed is:

1. An internal combustion engine (1), comprising a turbocharger (2) including a turbine (3) disposed in an exhaust duct (4) of the engine (1) to be driven by the engine exhaust gases and a main compressor (5) disposed in an intake duct (6) of the engine (1) and driven by the turbine (3) for supplying compressed combustion air to the engine (1) via the intake duct (6), the intake duct (6) including an actuator valve (11) for directing the combustion air to the engine (1) selectively via an auxiliary compressor (10) or a bypass line (14) bypassing the auxiliary compressor (10), said auxiliary compressor (10) having an impeller (15) mounted rotatably in a compressor housing (25) including an inlet duct (12), with an additional inlet line (13) which opens into the compressor inlet duct (12) in the area of the compressor impeller (15), said actuator valve (11) also controlling the gas supply to the compressor inlet duct (12) and to the additional inlet line (13), and an electric motor (16) connected to the compressor impeller (15) for rotation therewith, said auxiliary compressor (10) being operable by the electric motor (16) and also by a pressure drop in the air intake line (6) of the internal combustion engine (1), the compressor impeller (15) being also coupled to a flywheel (18) for driving the flywheel (18) together with the auxiliary compressor impeller (15) during low power engine operation while throttling the combustion air supplied to the engine (1) via the auxiliary compressor (10).

2. The internal combustion engine as claimed in claim 1, wherein the electric motor (16) is a low-power motor with a maximum power of 200 W.

3. The internal combustion engine as claimed in claim 1, wherein the electric motor (16) is arranged on the rear side of the compressor impeller.

4. The internal combustion engine as claimed in claim 1, wherein the rotor (34) of the electric motor (16) is arranged on a shaft (17) on which also the compressor impeller (15) is supported.

5. The internal combustion engine as claimed in claim 1, wherein the compressor impeller shaft (17) is mounted rotatably in a bearing housing (30) at oil-lubricated, sealed locations (36, 37) and, adjacent to the one side of the compressor impeller (15), a buffer space (33), which is sealed in relation to the compressor housing (25) and the bearing housing (30) by means of sealing locations, is provided between the compressor housing (25) and the beating housing (30), the electric motor (16) being arranged in the buffer space (33).

6. The internal combustion engine as claimed in claim 1, wherein the flywheel (18) is arranged on the compressor impeller shaft (17) adjacent the compressor impeller (15).

7. The internal combustion engine as claimed in claim 1, wherein an adjustable flow guide vane structure (24) is arranged in the opening region of the additional duct (13) into the compressor inlet duct (12).

8. The internal combustion engine as claimed in claim 1, wherein the exhaust gas turbine (3) is provided with variable turbine inlet flow vanes (8) for adjusting the effective turbine inlet cross section.

9. A method for operating an internal combustion engine (1), with an exhaust gas turbocharger (2) including a turbo-compressor (5) and an exhaust gas turbine (3), with an additional compressor (10) which is arranged downstream of the turbo-compressor (5) the compressor impeller (15) being operable by an electric motor (16) and being coupled to a flywheel (18), the compressor impeller (15) of the additional compressor (10) being furthermore bridgeable by a bypass (14) including an adjustable valve element (11), said method comprising the following method steps:

supplying during part-load operation or idle operation to the compressor impeller (15) combustion air via the additional duct (13) providing for cold air turbine operation, and controlling the compressor speed by controlling the electric motor(16), upon acceleration of the engine, supplying to the compressor impeller (15) with combustion air via the compressor inlet duct (12), and during full-load operation, opening the bypass (14) for bypassing the compressor impeller (15).

* * * * *